US 8,720,632 B2

(12) United States Patent
Oishi et al.

(10) Patent No.: US 8,720,632 B2
(45) Date of Patent: May 13, 2014

(54) TWO-WHEELED MOTOR VEHICLE

(75) Inventors: Akifumi Oishi, Shizuoka (JP);
Shinichiro Hata, Shizuoka (JP); Takuji Murayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 479 days.

(21) Appl. No.: 13/057,803

(22) PCT Filed: Jan. 16, 2009

(86) PCT No.: PCT/JP2009/000140
§ 371 (c)(1),
(2), (4) Date: Feb. 7, 2011

(87) PCT Pub. No.: WO2010/016162
PCT Pub. Date: Feb. 11, 2010

(65) Prior Publication Data
US 2011/0127099 A1 Jun. 2, 2011

(30) Foreign Application Priority Data
Aug. 8, 2008 (JP) .................................. 2008-204926

(51) Int. Cl.
*F02B 61/02* (2006.01)
*B62M 7/06* (2006.01)
*B60K 17/08* (2006.01)

(52) U.S. Cl.
CPC ................ *F02B 61/02* (2013.01); *B60K 17/08* (2013.01); *B62M 2701/0007* (2013.01)
USPC ....................................... 180/230; 74/336 R

(58) Field of Classification Search
CPC ........... F02B 61/02; B62M 2701/0007; B60K 17/06; B60K 17/08
USPC .................. 180/230, 339; 74/336 R, 336.539
See application file for complete search history.

(56) References Cited

U.S. PATENT DOCUMENTS 2,671,349 A * 3/1954 Kreis ........................... 74/336 R
2,679,166 A * 5/1954 Kreis ........................... 74/336 R
(Continued)

FOREIGN PATENT DOCUMENTS

JP    57-022448 A    2/1982
JP    59096414 A  *  6/1984 ............. F01M 11/00
(Continued)

OTHER PUBLICATIONS

Official Communication issued in corresponding European Patent Application No. 09804649.3, mailed on Jul. 18, 2011.
(Continued)

*Primary Examiner* — Paul N Dickson
*Assistant Examiner* — Wesley Potter
(74) *Attorney, Agent, or Firm* — Keating & Bennett, LLP

(57) ABSTRACT

A motorcycle having high durability and a large space below a seat includes an internal space at least a portion of which is located between an engine unit and a seat provided in a cover member. The engine unit is pivotally suspended on a body frame. A center axis of a cylinder extends obliquely upward from a crankcase and forwardly. Oil reservoirs and provided in a bottom of a crank chamber and a bottom of a portion of a transmission chamber located in a front portion of a transmission case, respectively. The oil reservoirs are communicated with each other by a communication path. A bottom surface of the transmission chamber in the portion in which portion the oil reservoir is provided is located downward of the bottom surface of the portion rearward of the oil reservoir of the transmission chamber.

7 Claims, 13 Drawing Sheets

(56) References Cited

U.S. PATENT DOCUMENTS

| | | | |
|---|---|---|---|
| 4,457,185 A * | 7/1984 | Yoshida et al. | 74/336 R |
| 4,505,352 A | 3/1985 | Onda et al. | |
| 7,334,556 B2 * | 2/2008 | Wachigai et al. | 123/195 HC |
| 2007/0240531 A1 | 10/2007 | Endo et al. | |
| 2011/0259696 A1 * | 10/2011 | Oishi et al. | 192/3.61 |

FOREIGN PATENT DOCUMENTS

| | | | | |
|---|---|---|---|---|
| JP | 62-23349 Y2 | 6/1987 | | |
| JP | 04-282054 A | 10/1992 | | |
| JP | 10-299873 A | 11/1998 | | |
| JP | 2003-278893 A | 10/2003 | | |
| JP | 2003-306191 A | 10/2003 | | |
| JP | 2006117022 A * | 5/2006 | | B62M 7/02 |
| JP | 2007-285372 A | 11/2007 | | |

OTHER PUBLICATIONS

Official Communication issued in International Patent Application No. PCT/JP2009/000140, mailed on Feb. 24, 2009.

Oishi et al., "Stepwise Automatic Transmission for Saddle Riding Type Vehicle, Power Unit Equipped With the Same, and Saddle Riding Type Vehicle Equipped With the Same,", U.S. Appl. No. 13/057,801, filed Feb. 7, 2011.

* cited by examiner

TWO-WHEELED MOTOR VEHICLE

BACKGROUND OF THE INVENTION

1. Field of the Invention

The present invention relates to a motorcycle. More specifically, the present invention relates to a motorcycle including an engine unit lubricated with oil.

2. Description of the Related Art

There are conventionally proposed motorcycles each using a belt drive continuously variable automatic transmission. With the motorcycle using the belt drive continuously variable automatic transmission, there is no need to perform transmission operation, thus facilitating steering. Therefore, motorcycles each using the belt drive continuously variable automatic transmission are widely and commonly used.

Meanwhile, in the belt drive continuously variable automatic transmission, it is necessary to cool a belt in order to inhibit deterioration of the belt. Therefore, a cooling air introduction port for introducing cooling air is normally provided in a transmission chamber.

However, if the cooling air is to be introduced into the transmission chamber, foreign matter is disadvantageously mixed into the transmission chamber along with the cooling air. In view of this problem, Japanese Patent Application Laid-Open No. 10-299873, for example, proposes forming a cooling air introduction port 503 on an inner cover 502 arranged below a seat 501 and connecting the cooling air introduction port 503 to a transmission chamber 504 with a hose 505 as shown in FIG. 13. Thus, arranging the cooling air introduction port 503 in a space surrounded by the seat 501 and the inner cover 502 effectively inhibits the foreign matter from being mixed into the transmission chamber 504 is effectively suppressed.

However, a motorcycle 500 disclosed in the Japanese Patent Application Laid-Open No. 10-299873 requires the hose 505 to be arranged below the seat 501. Therefore, it is disadvantageously difficult to increase the size of a storage space 506 provided below the seat 501.

For example, it may be considered to not provide the hose 505 in order to secure a large storage space. However, in that case, a position at which the cooling air introduction port is formed is lowered. This possibly causes foreign matter to be mixed into the transmission chamber. This possibly deteriorates durability of the transmission.

SUMMARY OF THE INVENTION

In view of the above-described problems, preferred embodiments of the present invention provide a motorcycle having high durability and a large space below a seat.

A motorcycle according to a preferred embodiment of the present invention includes a body frame, an engine unit, a driving wheel, a seat, and a cover member. The engine unit is pivotally suspended on the body frame. The engine unit includes an engine and a stepped automatic transmission. The driving wheel is driven by the engine unit. The seat is attached to the body frame so that at least a portion of the seat is located above the engine unit. The cover member is attached to the body frame and at least a portion of the cover member defines and forms an internal space located between the seat and the engine unit.

The engine includes a crankcase, a crankshaft, and a cylinder body. A crank chamber is defined and formed in the crankcase. The crankshaft is housed in the crank chamber. The cylinder body is connected to the crankcase. A cylinder is provided in the cylinder body. A center axis of the cylinder extends obliquely upward from the crankcase and forwardly.

The stepped automatic transmission includes a transmission case, an input shaft, an output shaft, and a gear pair. The transmission case is arranged so that a front portion of the transmission case is adjacent to the crankcase in a vehicle width direction. A transmission chamber is defined and formed in the transmission case. The input shaft is arranged in the transmission chamber. Rotation of the crankshaft is transmitted to the input shaft. The output shaft is arranged rearward of the input shaft in the transmission chamber. The driving wheel is attached to the output shaft. A plurality of gear pairs are arranged in the transmission chamber. The plurality of gear pairs transmit input shaft-side rotation to an output shaft side. The plurality of gear pairs differ in a reduction ratio from one another.

An oil reservoir is provided in each of a bottom of the crank chamber and a bottom of a portion of the transmission chamber located in the front portion of the transmission case. Oil supplied to each sliding unit of the engine and to the plurality of gear pairs is stored in the oil reservoir. A communication path is provided in the crankcase and the transmission case. The communication path communicates the oil reservoir provided in the crankcase with the oil reservoir provided in the transmission case. A bottom surface of the transmission chamber in the portion in which portion the oil reservoir is defined is located downward of the bottom surface of the transmission chamber in a portion rearward of the oil reservoir.

According to various preferred embodiments of the present invention, a motorcycle having high durability and a large space below a seat can be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Preferred embodiments of the present invention will be described hereinafter while referring to a motorcycle 1 shown in FIG. 1 as an example. However, a motorcycle according to the present invention is not limited to a specific type as long as the motorcycle includes a unit swing type engine. The motorcycle according to various preferred embodiments of the present invention may be, for example, a moped or a scooter.

Figure 1:
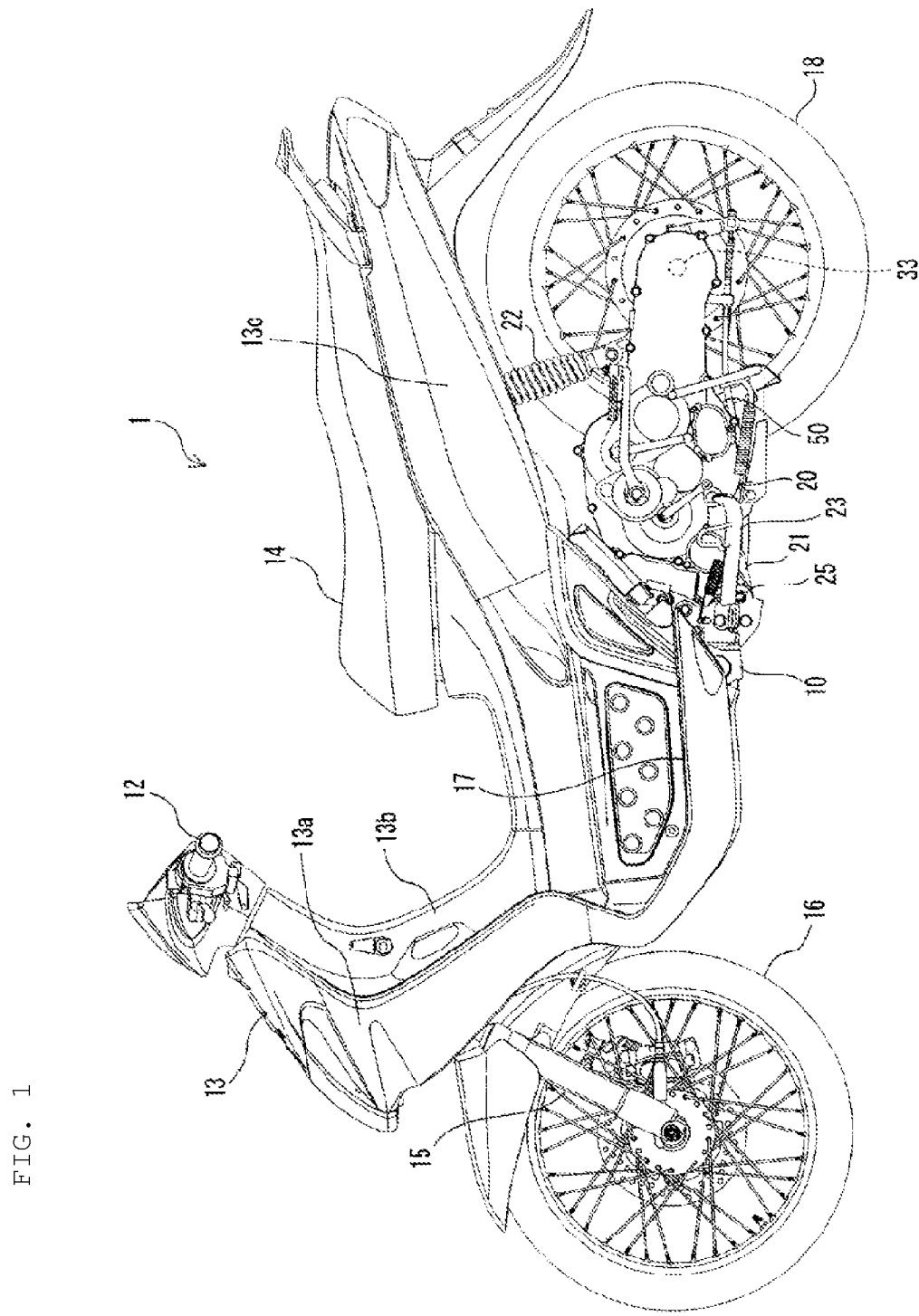
FIG. 1 is a left side view of a motorcycle according to a first preferred embodiment of the present invention.
Figure 2:
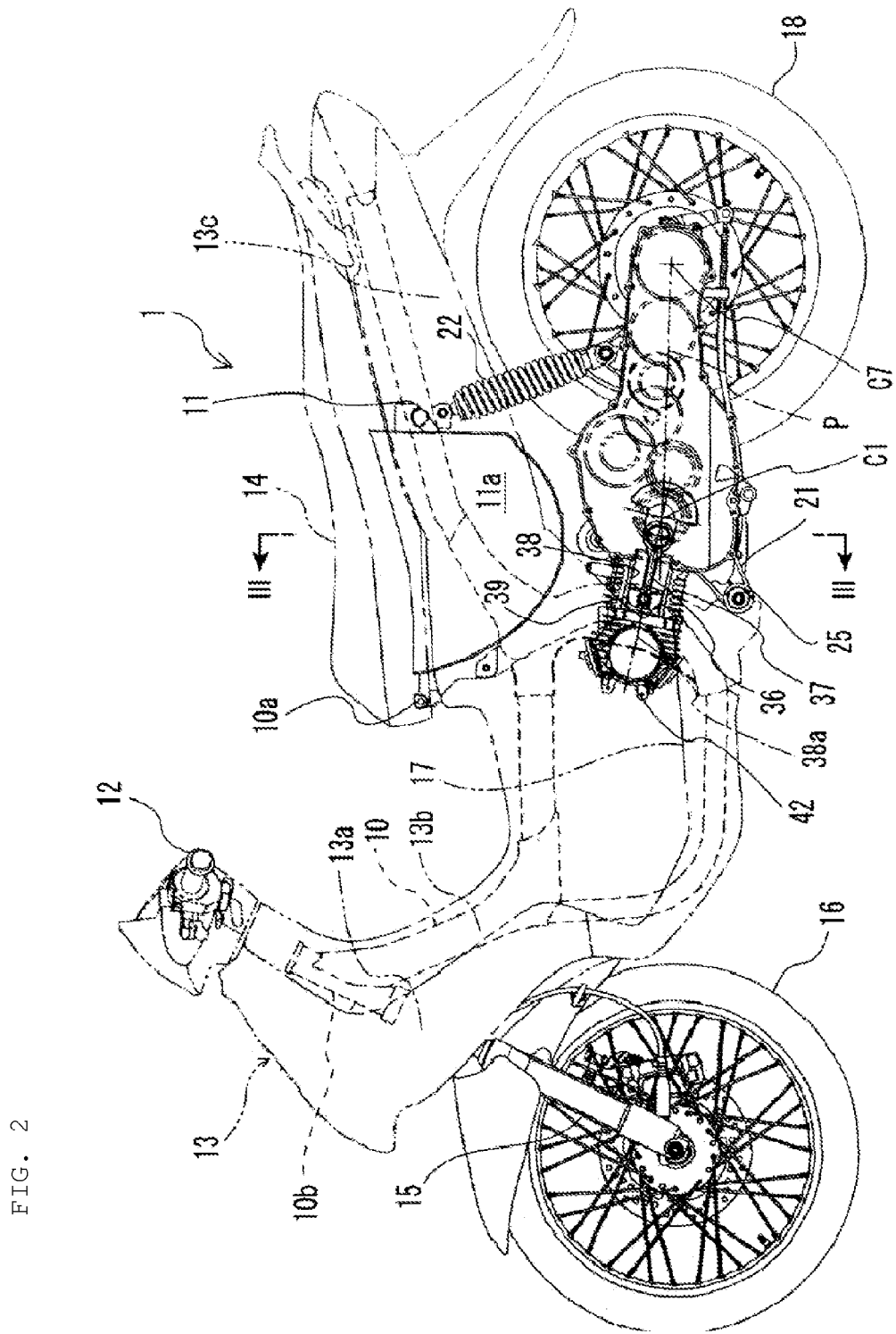
FIG. 2 is a left side view of the motorcycle according to the first preferred embodiment of the present invention.

Referring to FIGS. 1 and 2, a schematic configuration of the motorcycle 1 according to the first preferred embodiment of the present invention will first be described. Front/rear and left-right directions refer to directions viewed by a rider sitting on a seat 14 of the motorcycle 1, respectively.

As shown in FIG. 2, the motorcycle 1 includes a body frame 10. The body frame 10 includes a head pipe 10*b*. In a front portion of a vehicle, the head pipe 10*b* extends slightly obliquely forward in a downward direction. A steering shaft, not shown, is rotatably inserted into the head pipe 10*b*. A handlebar 12 is provided in an upper end portion of the steering shaft. On the other hand, a front fork 15 is connected to a lower end portion of the steering shaft. A front wheel 16 serving as a driven wheel is rotatably attached to a lower end portion of the front fork 15.

A body cover 13 is attached to the body frame 10. A portion of the body frame 10 is covered with this body cover 13. As shown in FIG. 1, the body cover 13 includes a front cowl 13*a*, a leg shield 13*b* and side cowls 13*c*. The front cowl 13*a* covers up a front side of the body frame 10. The leg shield 13*b* covers up a rear side of the head pipe 10*b* shown in FIG. 2. The side cowls 13*c* cover up both sides of the body frame 10, respectively. A footstep 17 on which the rider's foot is placed is arranged laterally to the side cowls 13*c*, respectively. Further, a side stand 23 is attached to the body frame 10 substantially at an approximate center of the vehicle.

An engine unit 20 is provided in the motorcycle 1. A rear wheel 18 serving as a driving wheel is attached to an output shaft 33 of the engine unit 20.

Figure 5:
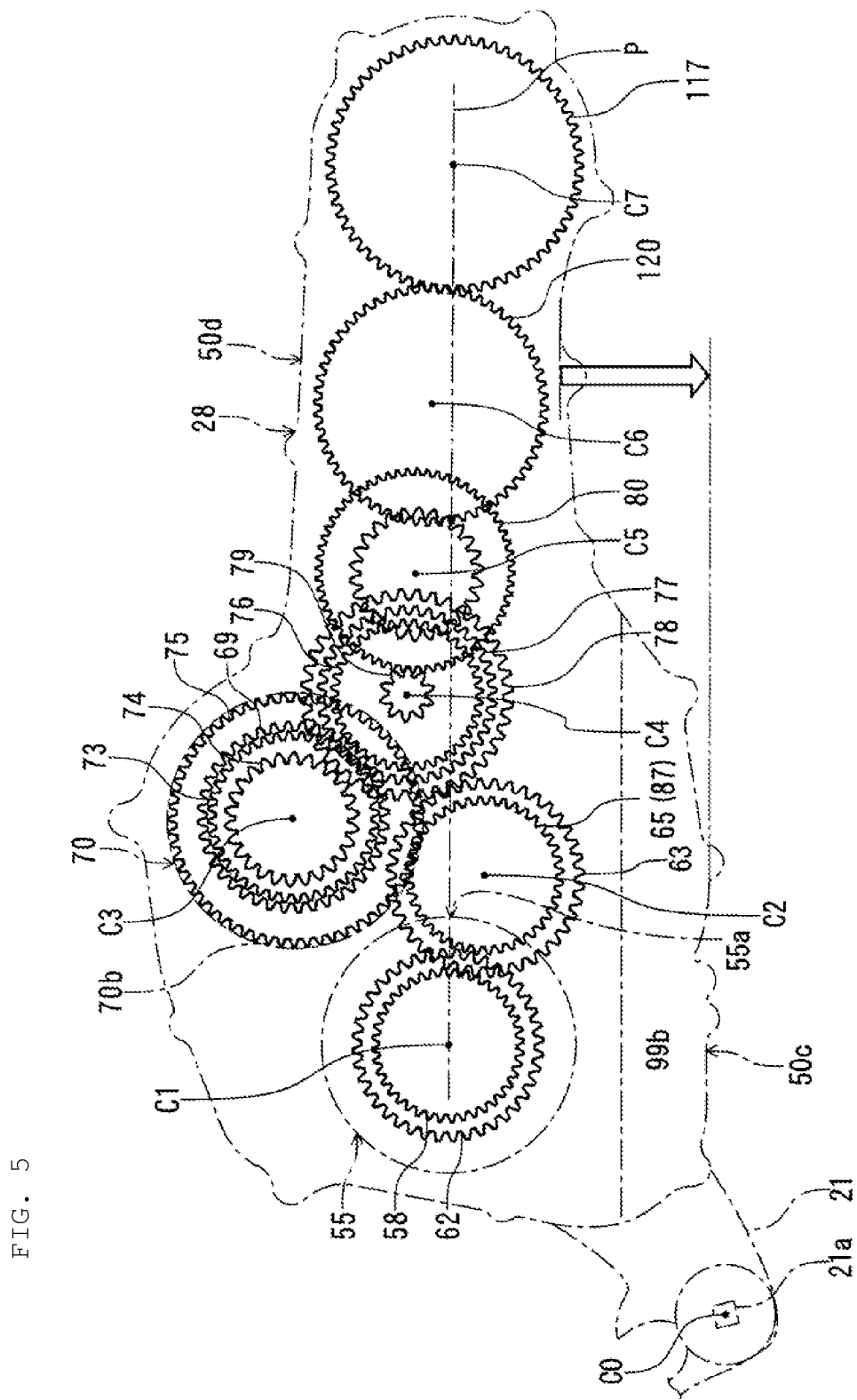
FIG. 5 is a schematic left side view representing an arrangement of shafts of the engine unit.

The engine unit 20 is a unit swing type engine unit. The engine unit 20 is pivotally suspended on the body frame 10. Specifically, a pivot shaft 25 extending in the vehicle width direction is attached to the body frame 10. On the other hand, as shown in FIG. 5, the engine unit 20 includes a casing 28. An engine bracket 21 serving as an attachment unit is provided in a lower portion of a front side of the casing 28. Specifically, the engine bracket 21 is provided in a crankcase 32 constituting a portion of the casing 28. An attachment hole 21*a* to which the pivot shaft 25 is fixed is provided in this engine bracket 21. The pivot shaft 25 is inserted into the attachment hole 21*a*. The engine unit 20 is thereby pivotally attached to the body frame 10.

This engine bracket 21 is located forward of a shaft center C1 of an input shaft 52 of a stepped automatic transmission 31 to be described later. Furthermore, this engine bracket 21 is located downward of the shaft center C1 of the input shaft 52 and downward of a cylinder body 37.

In a side view, a center C0 of the attachment hole 21*a* is located downward of the shaft center C1 of the input shaft 52. In the present specification, "a center of an attachment unit in a side view" refers to the center of the attachment hole in the side view.

As shown in FIG. 1, a cushion unit 22 is attached between the engine unit 20 and the body frame 10. This cushion unit 22 inhibits the engine unit 20 from swinging.

As shown in FIG. 2, the seat 14 is arranged above the engine unit 20. A front end of the seat 14 and a front end of the engine unit 20 are located at substantially the same position in the front/rear direction, that is, the engine unit 20 is arranged rearward of the front end of the seat 14. A front end portion of the seat 14 is rotatably attached to a shaft 10*a* of the body frame 10.

Figure 3:
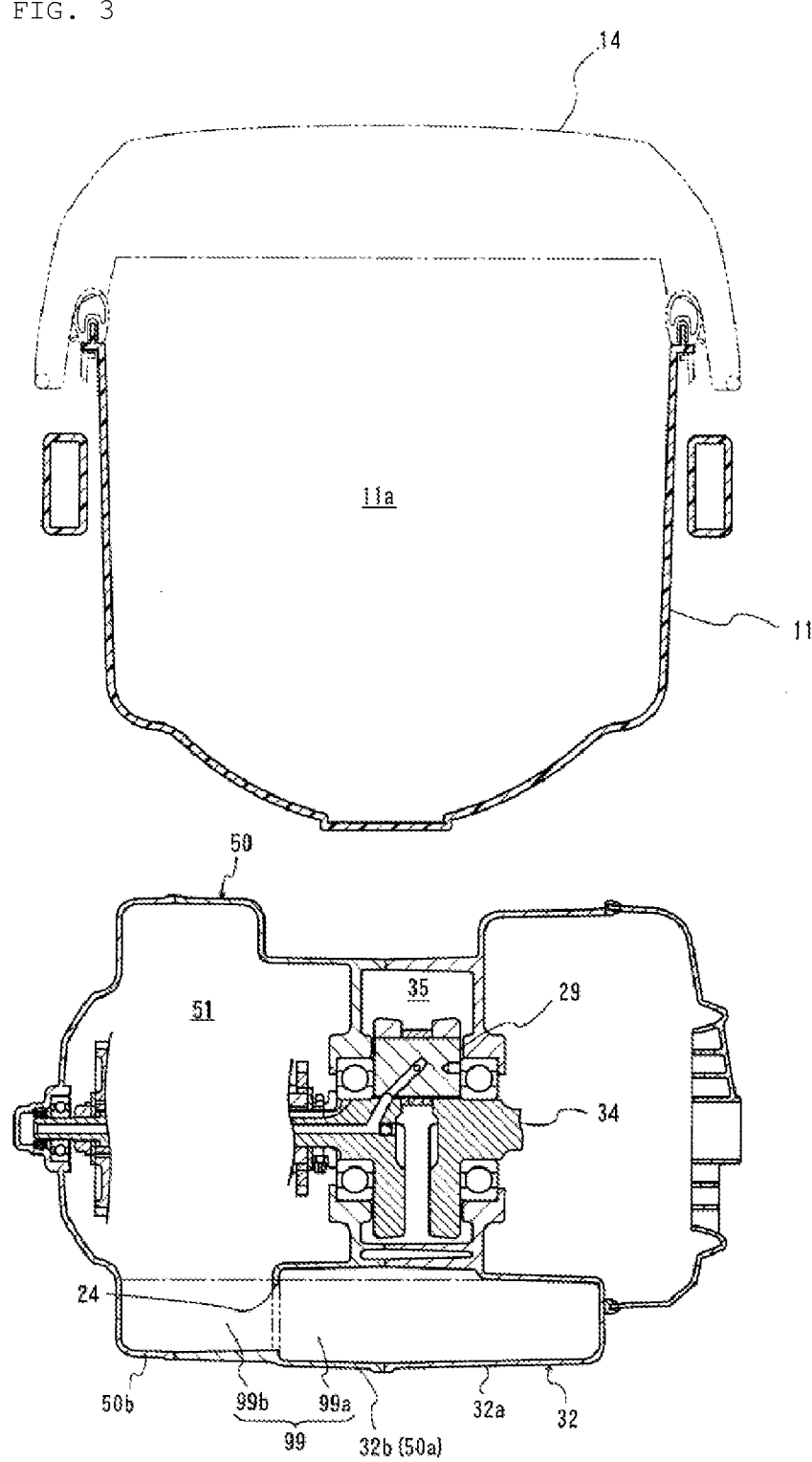
FIG. 3 is a view taken along II-II of FIG. 2.

As shown in FIGS. 2 and 3, a cover member 11 attached to the body frame 11 is arranged between the seat 14 and the engine unit 20. A storage space 11*a* serving as an internal space located between the seat 14 and the engine unit 20 is defined and formed in the cover member 11. In the present preferred embodiment, the storage space 11*a* serving as the internal space is a storage space in which the rider houses a helmet, a load and the like. The storage space 11*a* opens upward. An upper portion of the storage space 11*a* is covered with the seat 14. The storage space 11*a* is freely opened and closed by the rider's rotating the seat 14.

Figure 4:
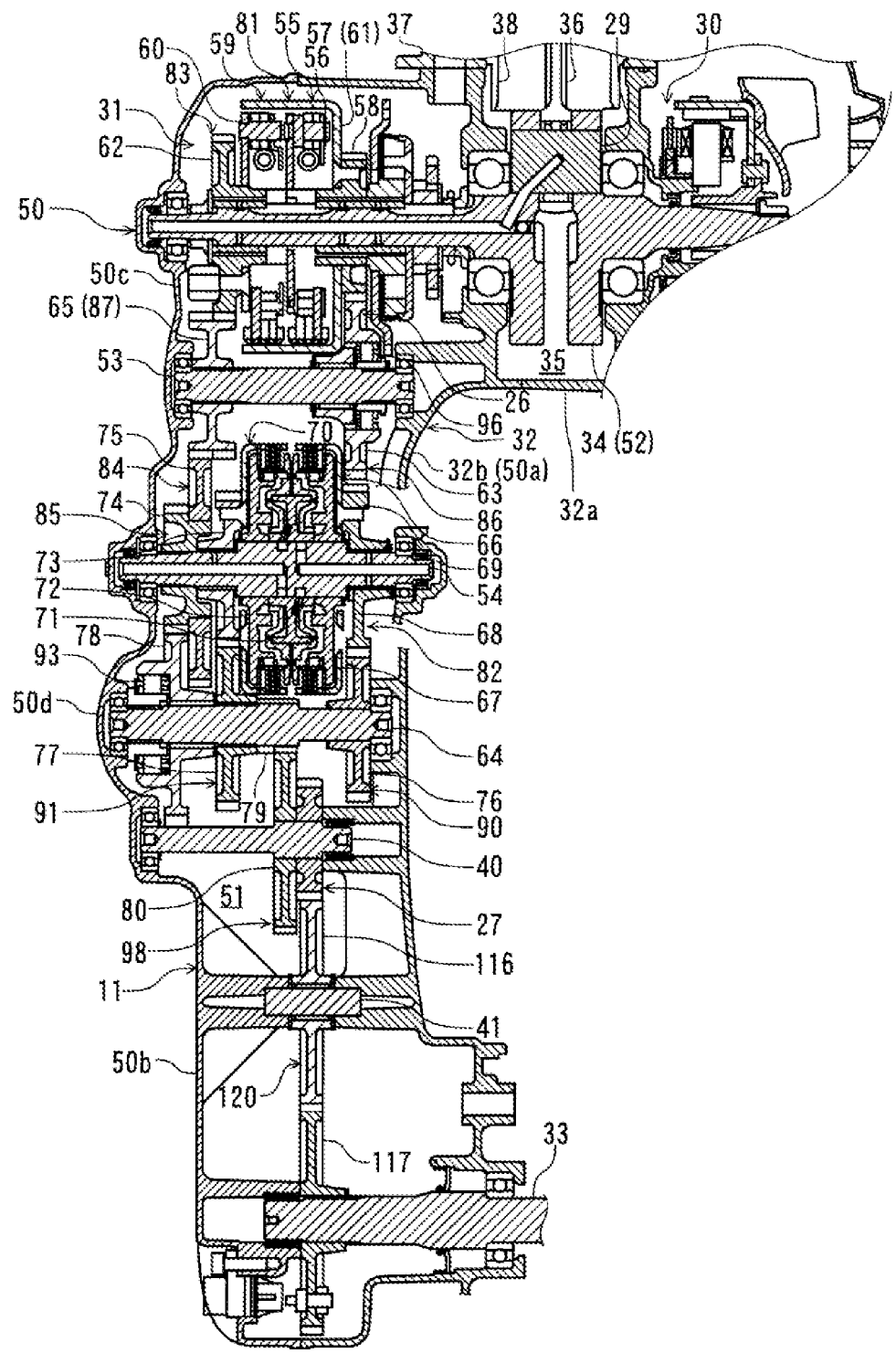
FIG. 4 is a cross-sectional view of an engine unit.

Referring to FIGS. 2 and 4 to 7, a configuration of the engine unit 20 will next be described. As shown in FIG. 4, the engine unit 20 includes an engine 30 and the stepped automatic transmission 31.

The engine 30 includes the crankcase 32. The crankcase 32 constitutes the casing 28 along with a transmission case 50 to be described later.

As shown in FIG. 3, the crankcase 32 includes a right casing unit 32*a* and a left casing unit 32*b*. The right casing unit 32*a* and the left casing unit 32*b* abut against each other in the vehicle width direction.

A crank chamber 35 is provided in the crankcase 32. A crankshaft 34 extending in the vehicle width direction is housed in the crank chamber 35. As shown in FIG. 4, a connecting rod 36 is connected to the crankshaft 34 by a crankpin 29. As shown in FIG. 2, a piston 39 is attached to a tip end of the connecting rod 36.

Figure 6:
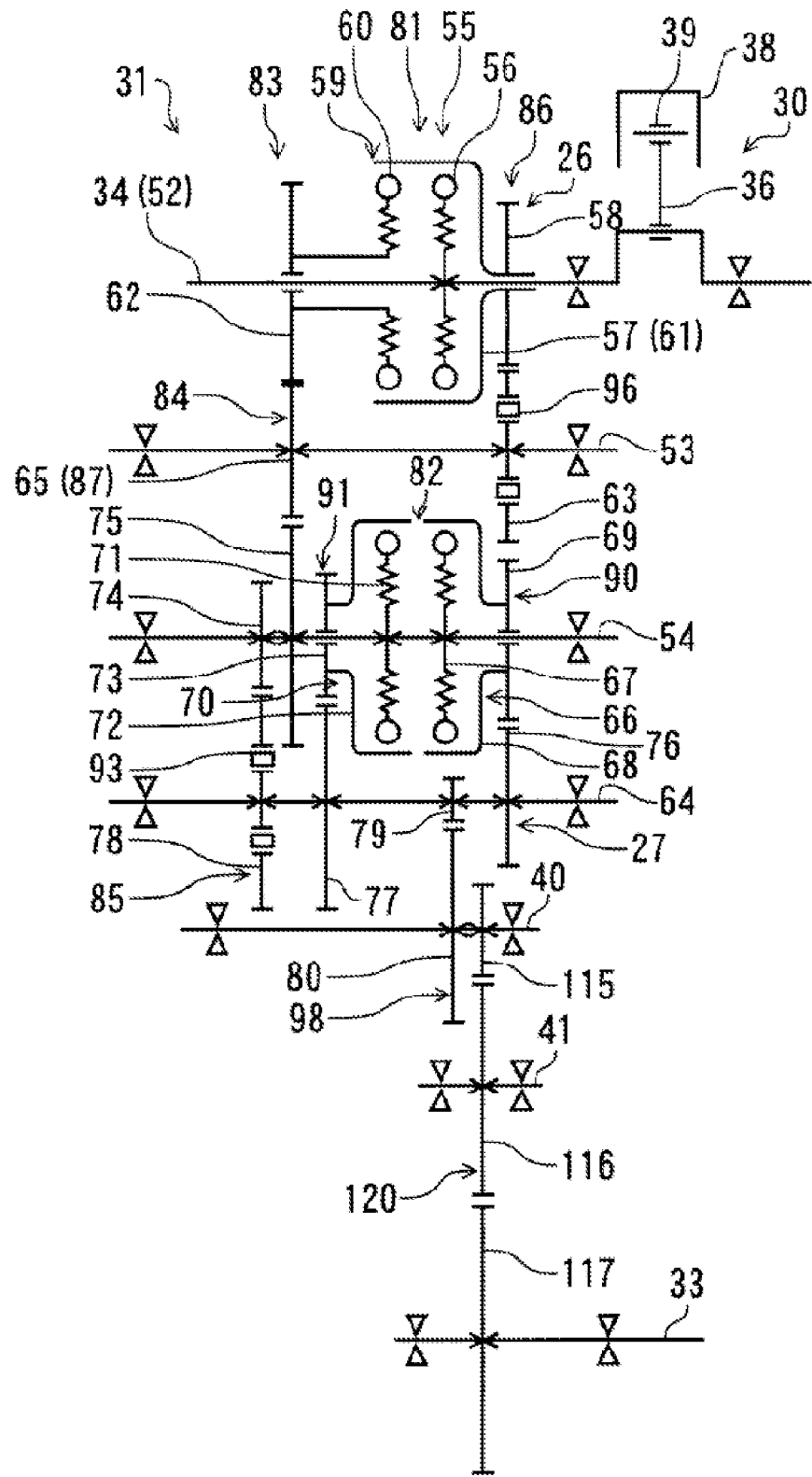
FIG. 6 is a pattern diagram representing a configuration of the engine unit.

The cylinder body 37 is connected to a front side portion of the crankcase 32. The cylinder body 37 extends slightly obliquely upward from the crankcase 32 ahead. A cylinder head 42 is connected to a tip end portion of the cylinder body 37. As shown in FIGS. 2, 4 and 6, a cylinder 38 in which the piston 39 is housed is defined and formed in the cylinder body 37.

As shown in FIG. 2, in the side view, a center axis 38*a* of the cylinder 38 is inclined with respect to a plane P passing through the shaft center C1 of the input shaft 52 and a shaft center C7 of the output shaft 33 of the stepped automatic transmission 31 to be described later. Specifically, in a state in which the motorcycle 1 stands still, the plane P is substantially horizontal whereas the center axis 38*a* extends slightly obliquely upward and forwardly.

As shown in FIG. 4, the transmission case 50 is provided at the left portion of the crankcase 32. Specifically, the transmission case 50 is arranged so that a front side portion 50*c* of the transmission case 50 abuts the crankcase 32 in the vehicle width direction. A portion 50*d* of the transmission case 50 located rearward of the front side portion 50*c* thereof is located rearward of the crankcase 32 in the front/rear direction. The rear side portion 50*d* is located on the left of the rear wheel 18.

The transmission case 50 includes a right casing unit 50*a* and a left casing unit 50*b*. The right casing unit 50*a* and the left casing unit 32*b* abut against each other in the vehicle width direction. The right casing unit 50*a* and the left casing unit 32*b* define and form a transmission chamber 51.

In the present preferred embodiment, the right casing unit 50*a* and the left casing unit 32*b* of the crankcase 32 preferably are constituted by a common member, e.g., a single unitary member. However, the present invention is not limited to this constitution. Alternatively, the right casing unit 50a and the left casing unit 32b may be constituted by different members, respectively.

The stepped automatic transmission 31 is arranged in the transmission chamber 51. The stepped automatic transmission 31 preferably is a four gear speed stepped automatic transmission. Specifically, the stepped automatic transmission 31 preferably is a so-called gear train type stepped automatic transmission powered from the input shaft 52 to the output shaft 33 via a plurality of transmission gear pairs.

In the present preferred embodiment, the input shaft 52 of the stepped automatic transmission 31 and the crankshaft 34 are preferably constituted by the same rotating shaft. However, the present invention is not limited to this constitution. For example, the input shaft 52 and the crankshaft 34 may be constituted by different rotating shafts, respectively. In that case, the input shaft 52 and the crankshaft 34 may be either arranged coaxially or arranged on different axes, for example.

The stepped automatic transmission 31 includes a first rotating shaft 53, a second rotating shaft 54, a third rotating shaft 64, a fourth rotating shaft 40 and a fifth rotating shaft 41, that is, preferably five rotating shafts in all on a power transmission path between the input shaft 52 and the output shaft 33. The input shaft 52, the first rotating shaft 53, the second rotating shaft 54, the third rotating shaft 64, the fourth rotating shaft 40, the fifth rotating shaft 41 and the output shaft 33 are arranged substantially in parallel to one another.

As shown in FIG. 5, a shaft center C2 of the first rotating shaft 53 is located rearward of the shaft center C1 of the input shaft 52. Further, the shaft center C2 of the first rotating shaft 53 is located downward of the shaft enter C1 of the input shaft 52. The shaft center C2 of the first rotating shaft 53 is located slightly downward of the plane P including the shaft center C1 of the input shaft 52 and the shaft center C7 of the output shaft 33.

A shaft center C3 of the second rotating shaft 54 is located rearward of each of the shaft center C1 of the input shaft 52 and the shaft center C2 of the first rotating shaft 53. The shaft center C3 of the second rotating shaft 54 is located upward of each of the shaft center C1 of the input shaft 52 and the shaft center C2 of the first rotating shaft 53. The shaft center C3 of the second rotating shaft 54 is located upward of the plane P.

A shaft center C4 of the third rotating shaft 64 is located rearward of each of the shaft center C1 of the input shaft 52, the shaft center C2 of the first rotating shaft 53 and the shaft center C3 of the second rotating shaft 54. The shaft center C4 of the third rotating shaft 64 is located slightly upward of each of the shaft center C1 of the input shaft 52 and the shaft center C2 of the first rotating shaft 53. The shaft center C4 of the third rotating shaft 64 is located downward of the shaft center C3 of the second rotating shaft 54. The shaft center C4 of the third rotating shaft 64 is located upward of the plane P.

A shaft center C5 of the fourth rotating shaft 40 is located rearward of the shaft center C1 of each of the input shaft 52, the shaft center C2 of the first rotating shaft 53, the shaft center C3 of the second rotating shaft 54 and the shaft center C4 of the third rotating shaft 64. The shaft center C5 of the fourth rotating shaft 40 is located slightly upward of each of the shaft center C1 of the input shaft 52 and the shaft center C2 of the first rotating shaft 53. The shaft center C5 of the fourth rotating shaft 40 is located downward of the shaft center C3 of the second rotating shaft 54. The shaft center C5 of the fourth rotating shaft 40 is located substantially at the same height as that of the shaft center C4 of the third rotating shaft 64. The shaft center C5 of the fourth rotating shaft 40 is located upward of the plane P.

A shaft center C6 of the fifth rotating shaft 41 is located rearward of each of the shaft center C1 of the input shaft 52, the shaft center C2 of the first rotating shaft 53, the shaft center C3 of the second rotating shaft 54, the shaft center C4 of the third rotating shaft 64 and the shaft center C5 of the fourth rotating shaft 40. The shaft center C6 of the fifth rotating shaft 41 is located slightly upward of each of the shaft center C1 of the input shaft 52 and the shaft center C2 of the first rotating shaft 53. The shaft center C6 of the fifth rotating shaft 41 is located downward of the shaft center C3 of the second rotating shaft 54, the shaft center C4 of the third rotating shaft 64 and the shaft center C5 of the fourth rotating shaft 40. The shaft center C6 of the fifth rotating shaft 41 is located upward of the plane P.

FIG. 6 shows a gear configuration of the stepped automatic transmission 31. It is to be noted that FIG. 6 typically shows the gear configuration of the stepped automatic transmission 31. Therefore, sizes of gears and clutches shown in FIG. 6 differ from actual sizes thereof.

As shown in FIGS. 6 and 4, an upstream clutch group 81 is provided with the input shaft 52. The upstream clutch group 81 includes a first clutch 55 and a third clutch 59. The first clutch 55 is arranged rightward of the third clutch 59.

Each of the first clutch 55 and the third clutch 59 is preferably constituted by a centrifugal clutch. However, the present invention is not limited to this constitution. Alternatively, the first clutch 55 and the third clutch 59 may be clutches other than the centrifugal clutches. For example, the first clutch 55 and the third clutch 59 may be hydraulic clutches. However, it is preferable that the first clutch 55 is a centrifugal clutch in this preferred embodiment of the present invention.

Specifically, in the present preferred embodiment, each of the first clutch 55 and the third clutch 59 is preferably constituted by a drum centrifugal clutch. However, each of the first clutch 55 and the third clutch 59 may be constituted by a multi-plate clutch, respectively.

The first clutch 55 includes an inner clutch member 56 serving as an input-side clutch member and an outer clutch member 57 serving as an output-side clutch member. The inner clutch member 56 is arranged to be non-rotatable with respect to the input shaft 52. Therefore, the inner clutch member 56 rotates along with the input shaft 52. On the other hand, the outer clutch member 57 is rotatable with respect to the input shaft 52. If a rotating speed of the input shaft 52 becomes higher than a predetermined rotating speed, a centrifugal force acting on the inner clutch member 56 causes the inner clutch member 56 to contact with the outer clutch member 57. The first clutch 55 is thereby engaged. On the other hand, if the rotating speed of the input shaft 52 becomes lower than the predetermined rotating speed while the input shaft 52 is rotating with the inner clutch member 56 connected to the outer clutch member 57, then the centrifugal force acting on the inner clutch member 56 weakens and the inner clutch member 56 separates from the outer clutch member 57. The first clutch 55 is thereby disengaged.

A first gear 58 is provided with the outer clutch member 57 of the first clutch 55 to be non-rotatable with respect to the outer clutch member 57. The first gear 58 rotates along with the outer clutch member 57 of the first clutch 55. On the other hand, a second gear 63 is provided with the first rotating shaft 53. The second gear 63 is geared with the first gear 58. The first gear 58 and the second gear 63 constitute a first transmission gear pair 86. In the present preferred embodiment, the first transmission gear pair 86 constitutes a first gear speed transmission gear pair.

The second gear 63 is a so-called one-way gear. Specifically, the second gear 63 transmits rotation of the first gear 58 to the first rotating shaft 53. However, the second gear 63 does not transmit the rotation of the first rotating shaft 53 to the input shaft 52. Specifically, the second gear 63 also serves as a one-way rotation transmission mechanism 96.

The third clutch 59 includes an inner clutch member 60 serving as an output-side clutch member and an outer clutch member 61 serving as an input-side clutch member.

A ninth gear 62 is provided with the inner clutch member 60 serving as the output-side clutch member of the third clutch 59. The ninth gear 62 rotates along with the inner clutch member 60. On the other hand, a tenth gear 65 is provided with the first rotating shaft 53. The tenth gear 65 is geared with the ninth gear 62. The tenth gear 65 and the ninth gear 62 constitute a third transmission gear pair 83. The third transmission gear pair 83 has a different gear ratio from that of the first transmission gear pair 86. Specifically, the third transmission gear pair 83 has a lower gear ratio than that of the first transmission gear pair 86. The third transmission gear pair 83 constitutes a second gear speed transmission gear pair.

As stated above, the inner clutch member 60 is arranged to be non-rotatable with respect to the ninth gear 62. When the input shaft 52 rotates, the rotation thereof is transmitted to the inner clutch member 60 via the first transmission gear pair 86, the first rotating shaft 53, and the third transmission gear pair 83. The inner clutch member 60 thus rotates along with the rotation of the input shaft 52. The outer clutch member 61 is rotatable with respect to the input shaft 52. If the rotating speed of the input shaft 52 becomes higher than the predetermined rotating speed, a centrifugal force acting on the inner clutch member 60 causes the inner clutch member 60 to contact with the outer clutch member 61. The third clutch 59 is thereby engaged. On the other hand, if the rotating speed of the input shaft 52 becomes lower than the predetermined rotating speed while the input shaft 52 is rotating with the inner clutch member 60 connected to the outer clutch member 61, then the centrifugal force acting on the inner clutch member 60 weakens and the inner clutch member 60 separates from the outer clutch member 61. The third clutch 59 is thereby disengaged.

In the present preferred embodiment, the outer clutch members 57 and 61 are preferably constituted by a same member. However, the present invention is not limited to this constitution. The outer clutch members 57 and 61 may be constituted by different members, respectively.

The rotating speed of the input shaft 52 when the first clutch 55 is engaged differs from that of the input shaft 52 when the third clutch 59 is engaged. Specifically, the rotating speed of the input shaft 52 when the first clutch 55 is engaged is lower than that of the input shaft 52 when the third clutch 59 is engaged. More specifically, the first clutch 55 is engaged when the rotating speed of the input shaft 52 is equal to or higher than a first rotating speed. On the other hand, the first clutch 55 is disengaged when the rotating speed of the input shaft 52 is lower than the first rotating speed. The third clutch 59 is engaged when the rotating speed of the input shaft 52 is equal to or higher than a second rotating speed higher than the first rotating speed. The third clutch 59 is disengaged when the rotating speed of the input shaft 52 is lower than the second rotating speed.

As shown in FIG. 4, the first clutch 55 and the third clutch 59 are located between the first transmission gear pair 86 and the third transmission gear pair 83 in the vehicle width direction.

In the present preferred embodiment, the tenth gear 65 also functions as a third gear 87. A fourth gear 75 is provided with the second rotating shaft 54 to be non-rotatable with respect to the second rotating shaft 54. The fourth gear 75 rotates along with the second rotating shaft 54. The third gear 87 also functioning as the tenth gear 65 is geared with the fourth gear 75. The third gear 87 also functioning as the tenth gear 65 and the fourth gear 75 constitutes a first transfer gear pair 84. This first transfer gear pair 84, the first transmission gear pair 86 and the third transmission gear pair 83 constitute a first power transmission mechanism 26. The first power transmission mechanism 26 transmits rotation of the input shaft 52 to the second rotating shaft 54.

A fifth gear 74 is provided with the second rotating shaft 54 to be non-rotatable with respect to the second rotating shaft 54. The fifth gear 74 rotates along with the second rotating shaft 54. On the other hand, a sixth gear 78 is provided with the third rotating shaft 64 to be non-rotatable with respect to the third rotating shaft 64. The third rotating shaft 64 rotates along with the sixth gear 78. The fifth gear 74 is geared with the sixth gear 78. The fifth gear 74 and the sixth gear 78 constitute a second transfer gear pair 85 serving as a first gear pair.

The sixth gear 78 preferably is a so-called one-way gear. Specifically, the sixth gear 78 transmits the rotation of the second rotating shaft 54 to the third rotating shaft 64. However, the sixth gear 78 does not transmit rotation of the third rotating shaft 64 to the second rotating shaft 54. Specifically, the sixth gear 78 includes a one-way rotation transmission mechanism 93.

However, the sixth gear 78 is not essentially the so-called one-way gear according to the present invention. For example, the sixth gear 78 may be an ordinary gear and the fifth gear 74 may be a so-called one-way gear. In other words, the fifth gear 74 may also serve as the one-way rotation transmission mechanism. Specifically, the fifth gear 74 may be configured to transmit the rotation of the second rotating shaft 54 to the sixth gear 78 and not to transmit the rotation of the sixth gear 78 to the second rotating shaft 54.

A downstream clutch group 82 is provided with the second rotating shaft 54. The downstream clutch group 82 is located rearward of the upstream clutch group 81. The downstream clutch group 82 and the upstream clutch group 81 are arranged at positions overlapping with each other at least partially in an axial direction of the input shaft 52. More specifically, the downstream clutch group 82 and the upstream clutch group 81 are arranged at positions substantially overlapping with each other in the vehicle width direction.

Further, as shown in FIG. 5, a front end 70b of a second clutch 70 is located forward of a rear end 55a of the first clutch 55 in a direction perpendicular or substantially perpendicular to the shaft center of the input shaft 52 on the plane including the shaft center of the input shaft 52 and the shaft center of the output shaft 33 if the motorcycle 1 is viewed from a direction of the shaft center of the input shaft 52. In various preferred embodiments of the present invention, when the motorcycle 1 is viewed from the shaft center of the input shaft 52 while the motorcycle 1 stands still, a front end of the downstream clutch group 82 is located forward of a rear end of the upstream clutch group 81.

As shown in FIG. 6, the downstream clutch group 82 includes the second clutch 70 and a fourth clutch 66. The fourth clutch 66 is arranged rightward of the second clutch 70. The first clutch 55 and the fourth clutch 66 are arranged to overlap with each other at least partially in the vehicle width direction. Furthermore, the third clutch 59 and the second clutch 70 are arranged to overlap with each other at least partially in the vehicle width direction. Specifically, the first clutch 55 and the fourth clutch 66 are arranged to substantially overlap with each other in the vehicle width direction. Further, the third clutch 59 and the second clutch 70 are arranged to substantially overlap with each other in the vehicle width direction.

Each of the second clutch 70 and the fourth clutch 66 is preferably constituted by a so-called hydraulic clutch, respectively. Specifically, in the present preferred embodiment, the second clutch 70 and the fourth clutch 66 are preferably constituted by multi-plate hydraulic clutches. However, the present invention is not limited to this constitution. The fourth clutch 66 and the second clutch 70 may be clutches other than the hydraulic clutches. For example, the fourth clutch 66 and the second clutch 70 may be centrifugal clutches. However, it is preferable that the fourth clutch 66 and the second clutch 70 are hydraulic clutches, respectively.

A rotating speed of the second rotating shaft 54 when the second clutch 70 is engaged differs from that of the second rotating shaft 54 when the fourth clutch 66 is engaged. Specifically, in the present preferred embodiment, the rotating speed of the second rotating shaft 54 when the second clutch 70 is engaged is lower than that of the second rotating shaft 54 when the fourth clutch 66 is engaged.

The second clutch 70 includes an inner clutch member 71 serving as an input-side clutch member and an outer clutch member 72 serving as an output-side clutch member. The inner clutch member 71 is provided non-rotatably with respect to the second rotating shaft 54. Therefore, the inner clutch member 71 rotates along with rotation of the second rotating shaft 54. On the other hand, the outer clutch member 72 is rotatable with respect to the second rotating shaft 54. When the second rotating shaft 54 rotates while the second clutch 70 is disengaged, the inner clutch member 71 rotates along with the second rotating shaft 54 but the outer clutch member 72 does not rotate along with the second rotating shaft 54. While the second clutch 70 is engaged, both the inner clutch member 71 and the outer clutch member 72 rotate along with the second rotating shaft 54.

A seventh gear 73 is attached to the outer clutch member 72 serving as the output-side clutch member of the second clutch 70. The seventh gear 73 rotates along with the outer clutch member 72. On the other hand, an eighth gear 77 is provided with the third rotating shaft 64 to be non-rotatable with respect to the third rotating shaft 64. The eighth gear 77 rotates along with the third rotating shaft 64. The seventh gear 73 is geared with the eighth gear 77. Therefore, rotation of the outer clutch member 72 is transmitted to the third rotating shaft 64 via the seventh gear 73 and the eighth gear 77.

The seventh gear 73 and the eighth gear 77 constitute a second transmission gear pair 91 serving as a second gear pair. The second transmission gear pair 91 has a gear ratio different from a gear ratio of the first transmission gear pair 86, that of the third transmission gear pair 83, and that of a fourth transmission gear pair 90.

The fourth clutch 66 includes an inner clutch member 67 serving as an input-side clutch member and an outer clutch member 68 serving as an output-side clutch member. The inner clutch member 67 is arranged to be non-rotatable with respect to the second rotating shaft 54. Therefore, the inner clutch member 67 rotates along with the rotation of the second rotating shaft 54. On the other hand, the outer clutch member 68 is rotatable with respect to the second rotating shaft 54. When the second rotating shaft 54 rotates while the fourth clutch 66 is disengaged, the inner clutch member 67 rotates along with the second rotating shaft 54 but the outer clutch member 68 does not rotate along with the second rotating shaft 54. While the fourth clutch 66 is engaged, both the inner clutch member 67 and the outer clutch member 68 rotate along with the second rotating shaft 54.

An eleventh gear 69 is attached to the outer clutch member 68 serving as the output-side clutch member of the fourth clutch 66. The eleventh gear 69 rotates along with the outer clutch member 68. On the other hand, a twelfth gear 76 is provided with the third rotating shaft 64 to be non-rotatable with respect to the third rotating shaft 64. The twelfth gear 76 rotates along with the third rotating shaft 64. The eleventh gear 69 is geared with the twelfth gear 76. Therefore, rotation of the outer clutch member 68 is transmitted to the third rotating shaft 64 via the eleventh gear 69 and the twelfth gear 76.

The twelfth gear 76 and the eleventh gear 69 constitute the fourth transmission gear pair 90. The fourth transmission gear pair 90 has the gear ratio different from the gear ratio of the first transmission gear pair 86 and that of the third transmission gear pair 83.

A thirteenth gear 79 is provided with the third rotating shaft 64 to be non-rotatable with respect to the third rotating shaft 64. The thirteenth gear 79 rotates along with the third rotating shaft 64. On the other hand, a fourteenth gear 80 is provided with the fourth rotating shaft 40 to be non-rotatable with respect to the fourth rotating shaft 40. This fourteenth gear 80 and the thirteenth gear 79 constitute a third transfer gear pair 98.

Furthermore, a fifteenth gear 115 is provided with the fourth rotating shaft 40 to be non-rotatable with respect to the fourth rotating shaft 40. The fifteenth gear 115 is geared with a seventeenth gear 117 non-rotatably provided with the output shaft 33 via a sixteenth gear 116 non-rotatably provided with the fifth rotating shaft 41. A fourth transfer gear pair 120 constituted by the fifteenth gear 115, the sixteenth gear 116, and the seventeenth gear 117 transmits rotation of the fourth rotating shaft 40 to the output shaft 33. The fourth transfer gear pair 120, the fourth transmission gear pair 90, the second transmission gear pair 91, the third transfer gear pair 98 and the second transfer gear pair 85 constitute a second power transmission mechanism 27. The second power transmission mechanism 27 transmits the rotation of the second rotating shaft 54 to the output shaft 33.

As shown in FIG. 3, an oil reservoir 99 is provided in the engine unit 20. The oil reservoir 99 stores oil. The oil stored in the oil reservoir 99 is supplied to sliding units of the engine 30 and the gear pairs 83 to 86, 90, 91 and 98 and the second and fourth clutches 70 and 66 of the stepped automatic transmission 31.

The oil reservoir 99 includes a first oil reservoir 99a located on a bottom of the crank chamber 35 and a second oil reservoir 99b located on a bottom of the transmission chamber 51. The first oil reservoir 99a and the second oil reservoir 99b communicate with each other by a communication hole 24 serving as a communication path defined and formed in the left casing unit 32b constituted by a common member to the right casing unit 50a.

As shown in FIG. 5, the second oil reservoir 99b is located in the front side portion 50c of the transmission case 50. The second oil reservoir 99b is not defined or formed in the rear side portion 50d of the transmission case 50. A bottom surface of the transmission chamber 51 in the front side portion 50c on which the second oil reservoir 99b is defined and formed is located downward of the bottom surface of the transmission chamber 51 in the rear side portion 50d in which the second oil reservoir 99b is not defined or formed.

Figure 7:
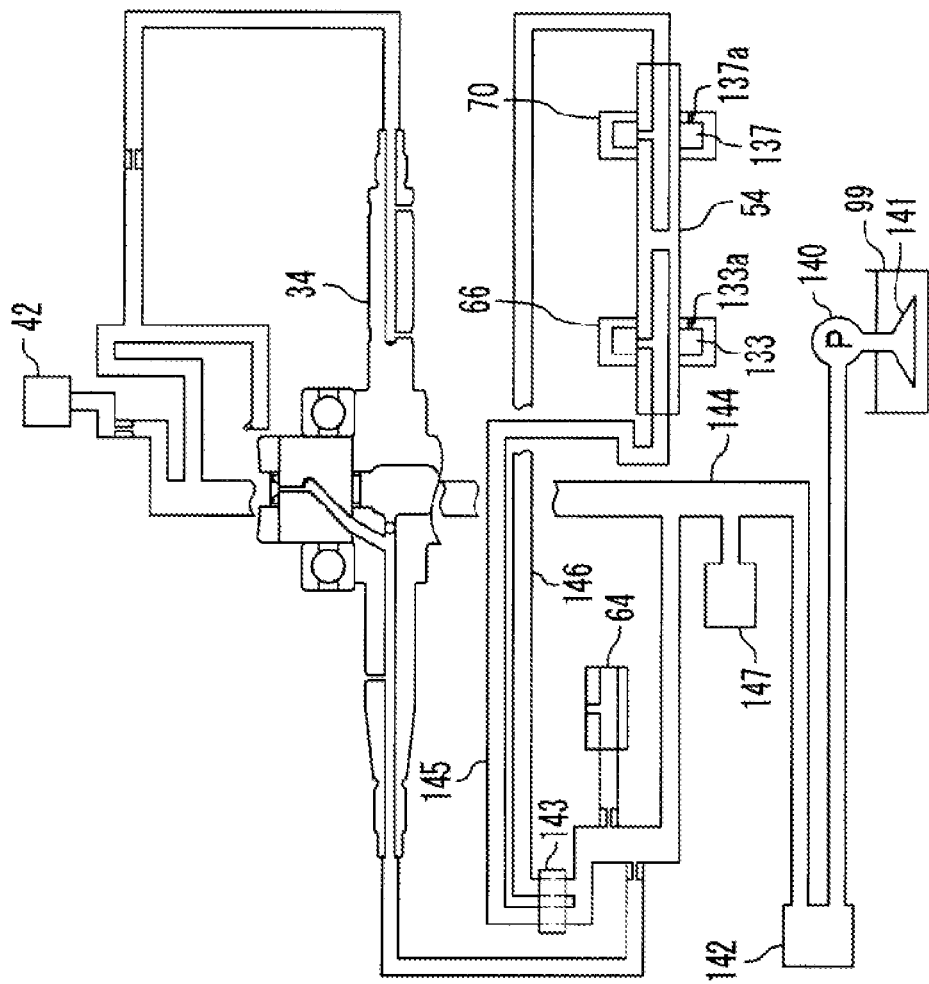
FIG. 7 is a conceptual view representing an oil circuit.

As shown in FIG. 7, a strainer 141 is dipped in the oil reservoir 99. The strainer 141 is connected to an oil pump 140. In the present preferred embodiment, the one oil pump 140 preferably supplies the oil to the sliding units of the engine 30 and to the gear pairs 83 to 86, 90, 91 and 98 and the second and fourth clutches 70 and 66 of the stepped automatic transmission 31.

A first oil path 144 is connected to the oil pump 140. An oil cleaner 142 and a relief valve 147 are provided halfway along the first oil path 144. The oil cleaner 142 purifies sucked oil. Further, the relief valve 147 prevents an internal pressure of the first oil path 144 from exceeding a predetermined pressure.

The first oil path 144 is connected to the crankshaft 34 and the cylinder head 42. The oil from the oil pump 140 is supplied to the respective sliding units of the engine 30 in the crankshaft 34 and the cylinder head 42 via the first oil path 144.

The first oil path 144 is connected to a second oil path 145 and a third oil path 146. The second oil path 145 is connected to a working chamber 137 of the second clutch 70. The third oil path 146 is connected to a working chamber 133 of the fourth clutch 66. Therefore, the oil is supplied to the second and fourth clutches 70 and 66 via the second and third oil paths 145 and 146, respectively.

A hydraulic pressure switch valve 143 is provided between the first oil path 144 and the second and third oil paths 145 and 146. This hydraulic pressure switch valve 143 connects or disconnects the first oil path 144 to or from the second and third oil paths 145 and 146.

Leakage holes 137*a* and 133*a* communicating with the working chambers 137 and 133 are defined and formed in the second clutch 70 and the fourth clutch 66, respectively. The oil supplied to the second clutch 70 and the fourth clutch 66 leaks from these leakage holes 137*a* and 133*a* to outside of the working chambers 137 and 133. The leaked oil scatters to follow rotation of the second and fourth clutches 70 and 66 and is supplied to the respective sliding units of the stepped automatic transmission 31 such as the gear pairs 83 to 86, 90, 91 and 98.

Operation performed by the stepped automatic transmission 31 will next be described with reference to FIGS. 8 to 11.

Figure 8:
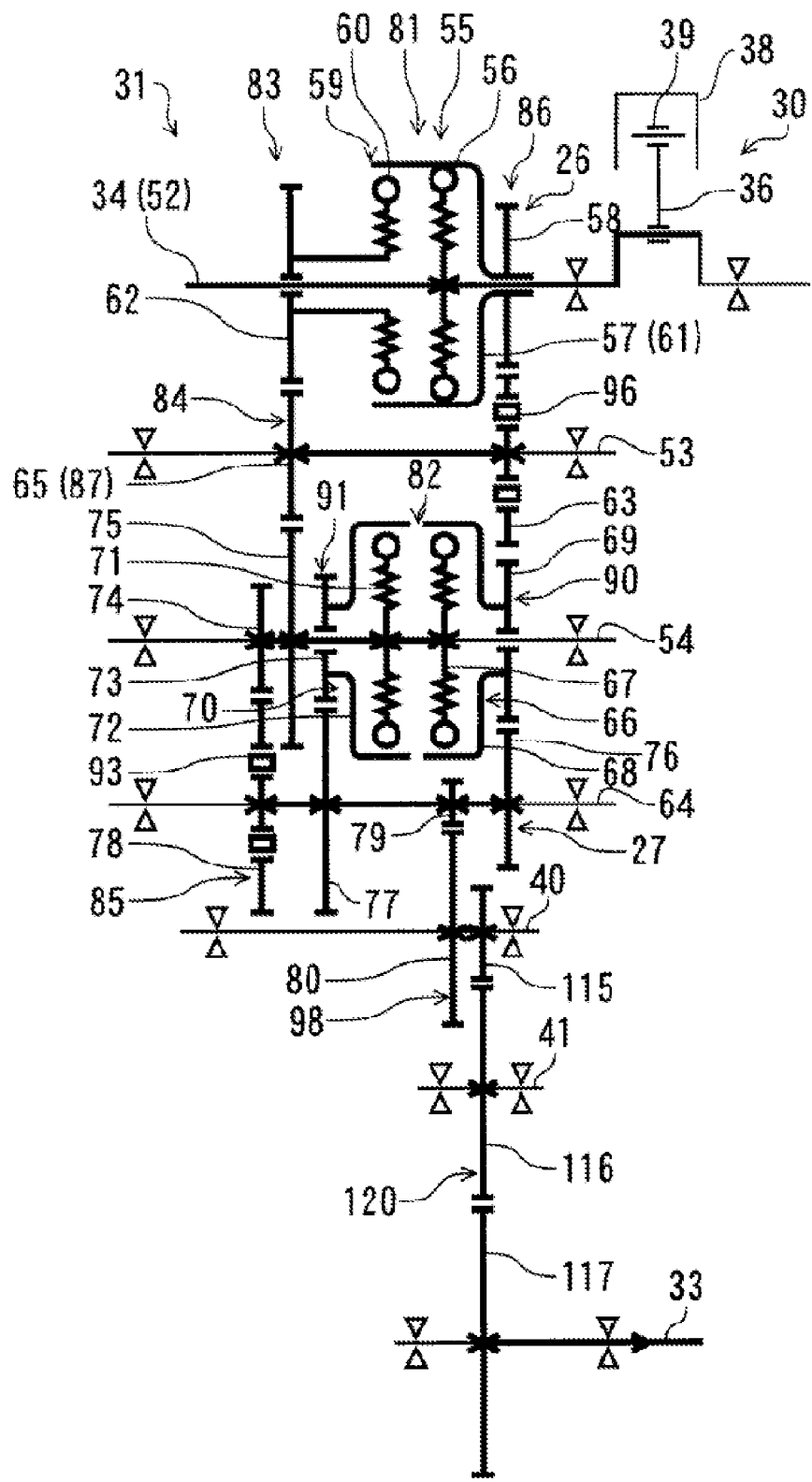
FIG. 8 is a pattern diagram for explaining a power transmission path during a first speed of a transmission.

First, when the engine 30 starts, the crankshaft 34 that is preferably integral with the input shaft 52 starts rotating. The inner clutch member 56 of the first clutch 55 rotates along with the input shaft 52. When the rotating speed of the input shaft 52 becomes equal to or higher than the first rotating speed, the first clutch 55 is engaged as shown in FIG. 8. When the first clutch 55 is engaged, the first transmission gear pair 86 rotates along with the outer clutch member 57 of the first clutch 55. The rotation of the input shaft 52 is thereby transmitted to the first rotating shaft 53.

The third gear 87 rotates along with the first rotating shaft 53. The first transfer gear pair 84 also rotates in accordance with rotation of the first rotating shaft 53. The rotation of the first rotating shaft 53 is, therefore, transmitted to the second rotating shaft 54 via the first transfer gear pair 84.

The fifth gear 74 rotates along with the second rotating shaft 54. The second transfer gear pair 85 also rotates in accordance with rotation of the second rotating shaft 54. The rotation of the second rotating shaft 54 is, therefore, transmitted to the third rotating shaft 64 via the second transfer gear pair 85.

The thirteenth gear 79 rotates along with the third rotating shaft 64. The third transfer gear pair 98 also rotates in accordance with rotation of the third rotating shaft 64. The rotation of the third rotating shaft 64 is, therefore, transmitted to the fourth rotating shaft 40 via the third transfer gear pair 98.

The fifteenth gear 115 rotates along with the fourth rotating shaft 40. The fourth transfer gear pair 120 also rotates in accordance with rotation of the third rotating shaft 40. The rotation of the fourth rotating shaft 40 is, therefore, transmitted to the output shaft 33 via the fourth transfer gear pair 120.

In this way, when the motorcycle 1 starts, that is, in a first gear speed of the motorcycle 1, rotation is transmitted from the input shaft 52 to the output shaft 33 via the first clutch 55, the first transmission gear pair 86, the first transfer gear pair 84, the second transfer gear pair 85, the third transfer gear pair 98 and the fourth transfer gear pair 120 as shown in FIG. 8.

The tenth gear 65 rotates along with the first rotating shaft 53. Therefore, the tenth gear 65 also rotates along with both the third transmission gear pair 83 and the inner clutch member 60 of the third clutch 59 in the first gear speed. However, in the first gear speed, the third clutch 59 is disengaged. Therefore, the rotation of the input shaft 52 is not transmitted to the first rotating shaft 53 via the third transmission gear pair 83.

Further, the eighth gear 77 and the twelfth gear 76 rotate along with the third rotating shaft 64. Therefore, the eighth gear 77 and the twelfth gear 76 also rotate along with both the second transmission gear pair 91 and the fourth transmission gear pair 90 in the first gear speed. However, in the first speed, both the second clutch 70 and the fourth clutch 66 are disengaged. Therefore, the rotation of the second rotating shaft 54 is not transmitted to the third rotating shaft 64 via the second transmission gear pair 91 and the fourth transmission gear pair 90.

In the first speed, the tenth gear 65 also functioning as the third gear 87 rotates along with the first rotating shaft 53. Therefore, the tenth gear 65 also rotates along with both the ninth gear 62 geared with the tenth gear 65 and the inner clutch member 60 of the third clutch 59. Therefore, if the rotating speed of the input shaft 52 increases, the rotating speed of the inner clutch member 60 of the third clutch 59 increases accordingly. When the rotating speed of the input shaft 52 becomes equal to or higher than the second rotating speed higher than the first rotating speed, then the rotating speed of the inner clutch member 60 increases accordingly and, as shown in FIG. 9, the third clutch 59 is engaged.

In the present preferred embodiment, the gear ratio of the third transmission gear pair 83 is lower than that of the first transmission gear pair 86. The rotating speed of the tenth gear 65 is, therefore, higher than that of the second gear 63. As a result, the rotation is transmitted from the input shaft 52 to the first rotating shaft 53 via the third transmission gear pair 83. However, the one-way rotation transmission mechanism 96 prevents the rotation of the first rotating shaft 53 from being transmitted to the input shaft 52.

Torque from the first rotating shaft 53 to the output shaft 33 is transmitted via the first transfer gear pair 84, the second transfer gear pair 85, the third transfer gear pair 98 and the fourth transfer gear pair 120 similarly to the first gear speed.

Figure 9:
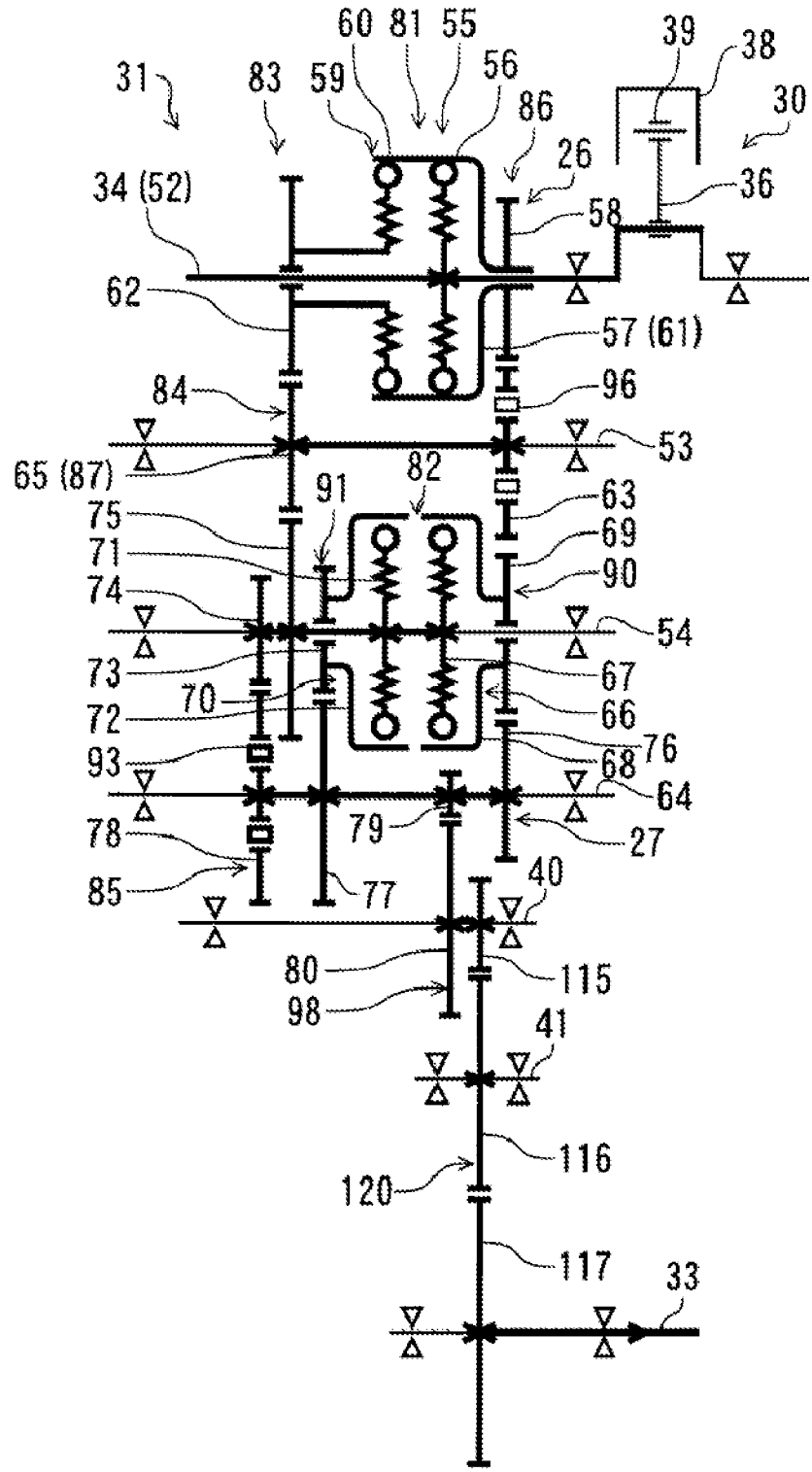
FIG. 9 is a pattern diagram for explaining a power transmission path during a second speed of the transmission.

In this way, in the second speed, the rotation is transmitted from the input shaft 52 to the output shaft 33 via the third clutch 59, the third transmission gear pair 83, the first transfer gear pair 84, the second transfer gear pair 85, the third transfer gear pair 98 and the fourth transfer gear pair 120 as shown in FIG. 9.

Figure 10:
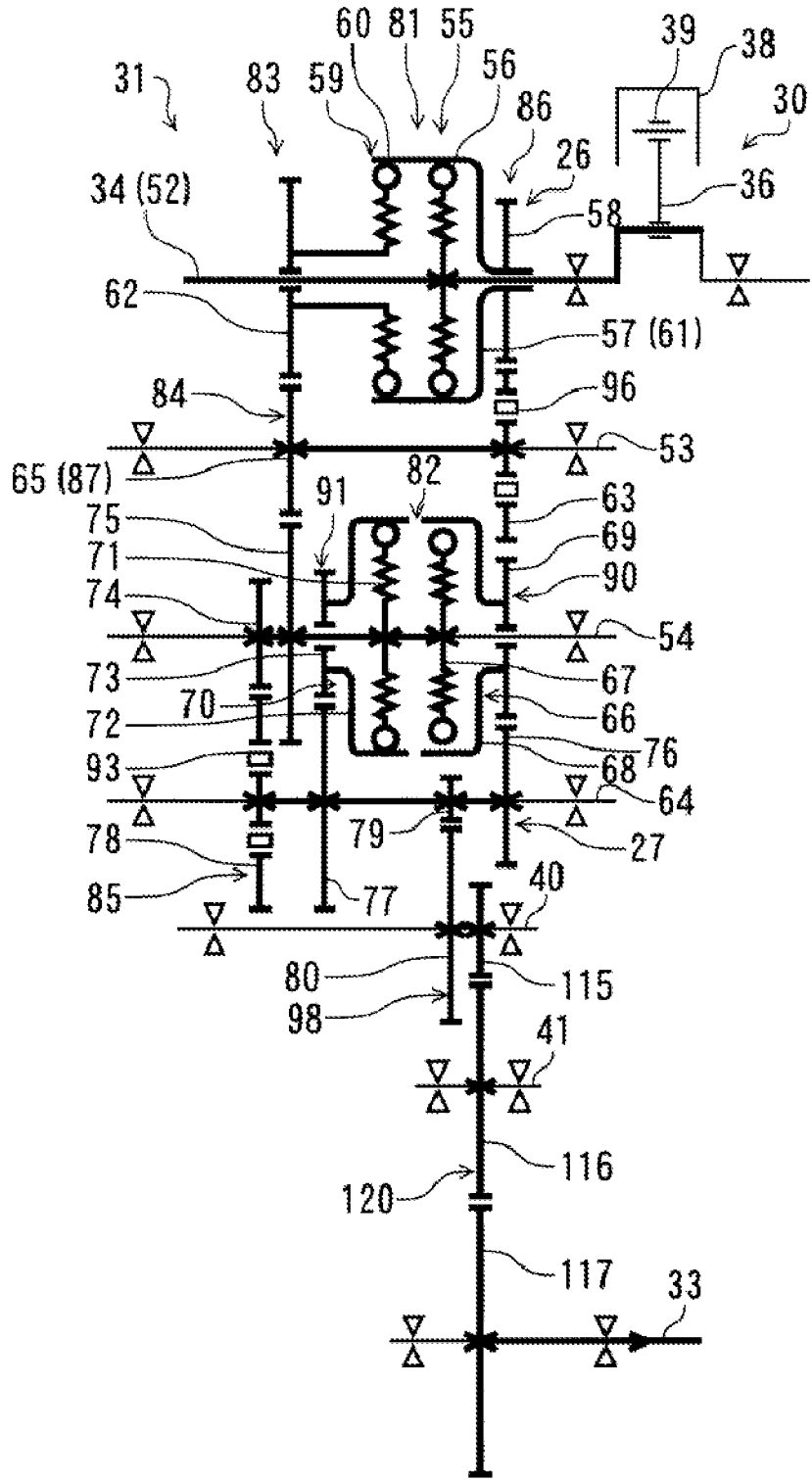
FIG. 10 is a pattern diagram for explaining a power transmission path during a third speed of the transmission.

In the second speed, when a rotating speed of the crankshaft 34 that is preferably integral with the input shaft 52 becomes higher than the second rotating speed and a vehicle speed becomes equal to or higher than a predetermined vehicle speed, the second clutch 70 is engaged as shown in FIG. 10. The gear ratio of the second transmission gear pair 91 is lower than that of the second transfer gear pair 85. Therefore, a rotating speed of the eighth gear 77 of the second transmission gear pair 91 is higher than that of the sixth gear 78 of the third transmission gear pair 83. Consequently, the rotation of the second rotating shaft 54 is transmitted to the third rotating shaft 64 via the second transmission gear pair 91. However, the one-way rotation transmission mechanism 93 prevents the rotation of the third rotating shaft 64 from being transmitted to the second rotating shaft 54.

Similarly to the first speed and the second speed, the rotation of the third rotating shaft 64 is transmitted to the output shaft 33 via the third transfer gear pair 98 and the fourth transfer gear pair 120.

In this way, in the third speed, the rotation is transmitted from the input shaft 52 to the output shaft 33 via the third clutch 59, the third transmission gear pair 83, the first transmission gear pair 84, the second clutch 70, the second transmission gear pair 91, the third transfer gear pair 98 and the fourth transfer gear pair 120 as shown in FIG. 10.

In the third speed, when the rotating speed of the crankshaft 34 that is preferably integral with the input shaft 52 becomes even higher and the vehicle speed becomes even higher, the hydraulic pressure switch valve 143 shown in FIG. 7 is driven to make the fourth clutch 66 engaged and make the second clutch 70 disengaged. In this case, the gear ratio of the fourth transmission gear pair 90 is lower than that of the second transfer gear pair 85. Therefore, a rotating speed of the twelfth gear 76 becomes higher than that of the sixth gear 78 of the second rotating shaft 85. As a result, rotation of the second rotating shaft 54 is transmitted to the third rotating shaft 64 via the fourth transmission pair 90. However, the one-way rotation transmission mechanism 93 prevents the rotation of the third rotating shaft 64 from being transmitted to the second rotating shaft 54.

Similarly to the first speed to third speed, the rotation of the third rotating shaft 64 is transmitted to the output shaft 33 via the third transfer gear pair 98 and the fourth transfer gear pair 120.

Figure 11:
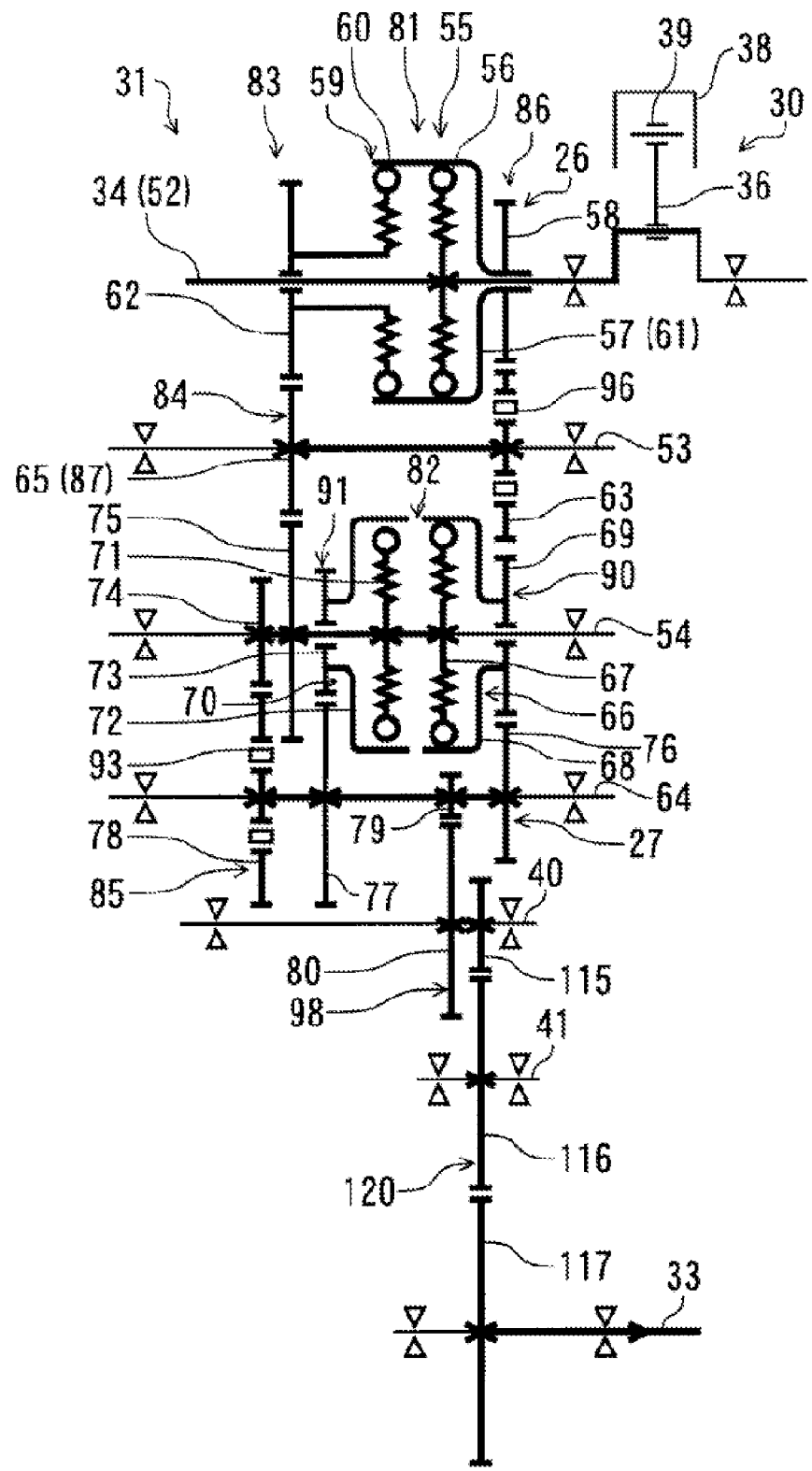
FIG. 11 is a pattern diagram for explaining a power transmission path during a fourth speed of the transmission.

In this way, in the fourth speed, the rotation is transmitted from the input shaft 52 to the output shaft 33 via the third clutch 59, the third transmission gear pair 83, the first transfer gear pair 84, the fourth clutch 66, the fourth transmission gear pair 90, the third transfer gear pair 98 and the fourth transfer gear pair 120 as shown in FIG. 11.

As described above, in the present preferred embodiment, the motorcycle 1 preferably uses the stepped automatic transmission 31 including a plurality of transmission gear pairs 83, 86, 91 and 92. As a result, as compared with using a belt drive automatic transmission, high durability of the motorcycle 1 can be realized.

For the stepped automatic transmission 31 including the plural transmission gear pairs 83, 86, 91 and 92, there is no need to introduce cooling air into the transmission chamber 51. Therefore, there is no need to provide a duct or the like for introducing the cooling air into the transmission chamber 51.

Further, as shown in FIG. 2, in the motorcycle 1, the center axis 38a of the cylinder 38 extends obliquely upward and forwardly. The oil supplied to the cylinder body 37 and the cylinder head 42 is thereby efficiently collected into the oil reservoir 99 via the cylinder 38. In addition, as shown in FIG. 5, the bottom surface of the transmission chamber 51 in the front side portion 50c is located downward of the bottom surface of the transmission chamber 51 in the rear side portion 50d. The oil supplied to the respective sliding units of the stepped automatic transmission 31 is thereby efficiently collected into the oil reservoir 99 provided with the front side portion 50c. As a result, a necessary amount of oil is reduced. Further, the oil supplied to the respective sliding units of the engine 30 and the oil supplied to the respective sliding units of the stepped automatic transmission 31 are stored in the oil reservoir 99 in common. Therefore, as compared with an instance of separately providing an oil reservoir for the engine 30 and that for the stepped automatic transmission 31, the amount of necessary oil is reduced. A capacity of the oil reservoir 99 can be consequently reduced, enabling a reduced height of the oil reservoir 99. Therefore, a height of the front side portion 50c of the stepped automatic transmission 31 can be reduced.

As can be seen, in the present preferred embodiment, there is no need to provide the duct for introducing the cooling air and the height of the front side portion 50c of the stepped automatic transmission 31 can be reduced. It is, therefore, possible to secure a large space between the seat 14 and the engine unit 20. As a result, the large storage space 11a shown in FIG. 2 can be secured.

In the present preferred embodiment, the common oil pump 140 supplies the oil to the respective sliding units of the engine 30 and supplies the oil to those of the stepped automatic transmission 31. Therefore, as compared with an instance of separately providing an oil pump for the engine 30 and that for the stepped automatic transmission 31, the engine unit 20 can be reduced in size. It is, therefore, possible to secure the larger storage space 11a.

In the present preferred embodiment, as shown in FIG. 5, the engine bracket 21 serving as the attachment unit is provided forward of the shaft center C1 of the crankshaft 34. Therefore, a distance between the engine bracket 21 and the oil reservoir 99 is short. Therefore, an amount of swinging of the oil reservoir 99 when the engine unit 20 swings relatively to the vehicle frame 10 can be reduced, enabling the oil reservoir 99 to be shallower. As a result, the height of the front side portion 50c of the stepped automatic transmission 31 can be further reduced. It is, therefore, possible to secure the larger storage space 11a.

Further, in the present preferred embodiment, as shown in FIG. 2, the engine bracket 21 is provided downward of the cylinder body 37. This can make the distance between the engine bracket 21 and the oil reservoir 99 particularly shorter. Therefore, the amount of swinging of the oil reservoir 99 can be reduced, enabling the oil reservoir 99 to be shallower. As a result, the height of the front side portion 50c of the stepped automatic transmission 31 can be further reduced. It is, therefore, possible to further enlarge the storage space 11a.

In the present preferred embodiment, as shown in FIG. 5, the shaft center C3 of the second rotating shaft 54 on which the second and fourth clutches 70 and 66 are provided is not present on the plane P. Specifically, the shaft center C3 is located upward of the plane P. Therefore, as compared with, for example, an instance in which the shaft center C3 is located on the plane P, the second rotating shaft 54 and the second and fourth clutches 70 and 66 can be arranged forward. Mass of the stepped automatic transmission 31 can be thus concentrated on the front side. This can reduce an amount of swinging at center of gravity of the stepped automatic transmission 31, enabling the oil reservoir 99 to be shallower. As a result, the height of the front side portion 50c of the stepped automatic transmission 31 can be further reduced. It is, therefore, possible to further enlarge the storage space 11a.

Second Preferred Embodiment

In the first preferred embodiment, description has been be given of the instance in which the power is preferably transmitted between the input shaft 52 and the output shaft 33 only by a plurality of gear pairs. However, the power may be transmitted between the input shaft 52 and the output shaft 33 by a power transmission mechanism other than the gear pairs. For example, a chain may be used for power transmission on at least a portion of the power transmission path between the input shaft 52 and the output shaft 33.

Figure 12:
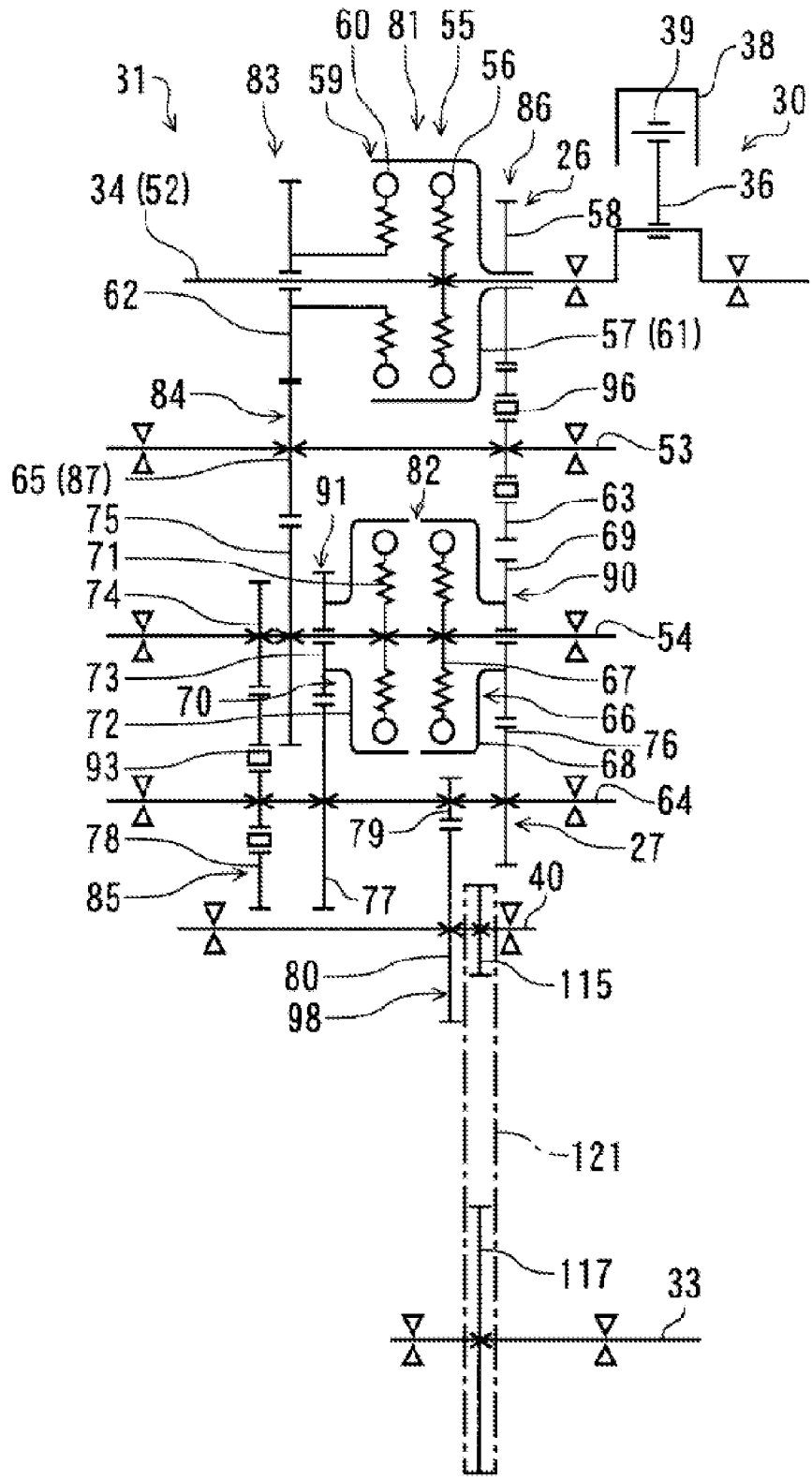
FIG. 12 is a pattern diagram representing a configuration of an engine unit according to a second preferred embodiment of the present invention.
Figure 13:
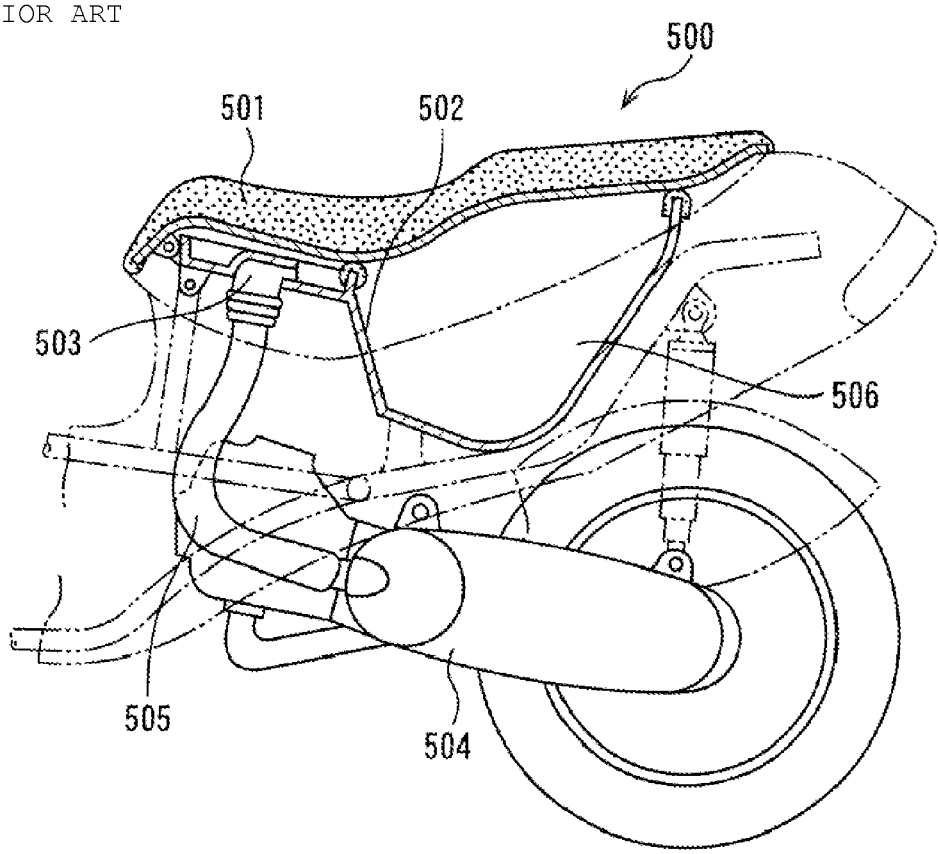
FIG. 13 is a side view representing part of a motorcycle disclosed in Japanese Patent Application Laid-Open No. 10-299873.

As shown in FIG. 12, for example, a chain 121 may be used as a portion of the second power transmission mechanism 27. Specifically, in an example shown in FIG. 12, the chain 121 is wound around a fifteenth gear 115 and a seventeenth gear 117. The fifth rotating shaft 41 and the sixteenth gear 116 shown in FIG. 6 will be thus unnecessary. This can reduce the number of components of the transmission.

Alternatively, the power may be transmitted between the input shaft 52 and one of the first to fifth rotating shafts 53, 54, 64, 40 and 41 by a chain.

Modifications of Preferred Embodiments

In the preferred embodiments described above, an arrangement in which the internal space of the cover member 11 is preferably used as the storage space 11a has been described. However, the internal space of the cover member 11 may be used as a space other than the storage space. The internal space of the cover member 11 may be used, for example, as an arrangement space for electric components or a fuel tank.

In the first preferred embodiment described above, the arrangement in which the shaft center C3 of the second rotating shaft 54 is preferably located upward of the plane P has been described. However, the present invention is not limited to this arrangement. For example, the shaft center C3 may be located downward of the plane P.

In the preferred embodiments described above, the four-gear speed stepped automatic transmission 31 has been described as an example of the preferred embodiments for carrying out the present invention. However, the present invention is not limited to this. For example, the stepped automatic transmission 31 may be a five or more-gear speed transmission. In that case, two more rotating shafts may be provided between the third rotating shaft 64 and the output shaft 33 and additional clutches and transmission gear pairs may be provided with the two shafts.

Further, the stepped automatic transmission 31 may be, for example, a three-gear speed transmission. Specifically, if the three-gear speed transmission is provided, the transmission may be constituted not to provide the fourth clutch 66 and the second transmission gear pair 91 of the stepped automatic transmission 31 shown in FIG. 6.

Furthermore, the stepped automatic transmission 31 may be, for example, a two gear-speed transmission. Specifically, if the two-gear speed transmission is constituted, the transmission may be constituted not to provide the third clutch 59, the fourth transmission gear pair 90, the one-way rotation transmission mechanism 96, the fourth clutch 66 and the second transmission gear pair 91 of the stepped automatic transmission 31 shown in FIG. 6.

In the preferred embodiments described above, the instance in which the engine 30 preferably is a single cylinder engine has been described. However, in the present invention, the engine 30 is not limited to the single cylinder engine. The engine 30 may be, for example, a multi-cylinder engine such as a two-cylinder engine.

In the preferred embodiments described above, the instance in which the gear pairs preferably are directly geared with one another has been described. However, the present invention is not limited to this instance. The gear pairs may be geared with one another indirectly via separately provided gears.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A motorcycle comprising:
    a body frame;
    an engine unit suspended from the body frame, and including an engine and a stepped automatic transmission;
    a driving wheel which is driven by the engine unit;
    a seat attached to the body frame so that at least a portion of the seat is located above the engine unit; and
    a cover member attached to the body frame, at least a portion of the cover member defining and forming an internal space located between the seat and the engine unit; wherein
    the engine includes:
        a crankcase;
        a crank chamber defined and formed in the crankcase;
        a crankshaft housed in the crank chamber; and
        a cylinder body connected to the crankcase, a cylinder provided in the cylinder body, a center axis of the cylinder extending obliquely upward from the crankcase and forwardly; and
    the stepped automatic transmission includes:
        a transmission case arranged so that a front portion of the transmission case is adjacent to the crankcase in a vehicle width direction, the transmission case including a front side portion and a rear side portion;
    a transmission chamber defined and formed in the transmission case;
        an input shaft arranged in the transmission chamber such that rotation of the crankshaft is transmitted to the input shaft;
        an output shaft arranged rearward of the input shaft in the transmission chamber, the driving wheel being attached to the output shaft; and
        a plurality of gear pairs arranged in the transmission chamber to transmit rotation of the input shaft to the output shaft, the plurality of gear pairs differing in a reduction ratio from one another, and the plurality of gear pairs provided in both the front side portion and the rear side portion of the transmission case; wherein
        an oil reservoir is provided in each of a bottom of the crank chamber and a bottom of a portion of the transmission chamber located in the front portion of the transmission case, oil being supplied to each sliding unit of the engine and to the plurality of gear pairs and being stored in the oil reservoir;
        a communication path, which communicates the oil reservoir provided in the crankcase with the oil reservoir provided in the transmission case, is located in the crankcase and the transmission case; and
        the oil reservoir is located in the front side portion of the transmission case but not in the rear side portion of the transmission case.

2. The motorcycle according to claim 1, further comprising an oil pump arranged to supply the oil stored in the oil reservoir to each sliding unit of the engine and the plurality of gear pairs.

3. The motorcycle according to claim 1, wherein the crankcase includes an attachment unit pivotally attached to the body frame.

4. The motorcycle according to claim 1, wherein at least one of the crankcase and the transmission case is provided forward of a shaft center of the crankshaft and includes an attachment unit pivotally attached to the body frame.

5. The motorcycle according to claim 4, wherein the attachment unit is located downward of the cylinder body.

6. The motorcycle according to claim 1, wherein the stepped automatic transmission further includes:
- an intermediate shaft arranged on a power transmission path between the input shaft and the output shaft; and
- a clutch provided with the intermediate shaft and engaged and disengaged according to a rotating speed of the intermediate shaft; wherein the plurality of gear pairs each includes:
- a first gear pair arranged to transmit rotation of the intermediate shaft to the output shaft while the clutch is disengaged; and
- a second gear pair which has a different reduction ratio from a reduction ratio of the first gear pair, and transmits the rotation of the intermediate shaft to the output shaft when the clutch is engaged; wherein
- a shaft center of the intermediate shaft is located upward or downward of a plane including a shaft center of the input shaft and a shaft center of the output shaft.

7. The motorcycle according to claim 1, wherein a bottom surface of the transmission chamber in the front side portion of the transmission case is located downward of a bottom surface of the transmission chamber in the rear side portion of the transmission case.

\* \* \* \* \*